Jan. 1, 1957   M. PISANO   2,775,780
WINDSHIELD WIPERS
Filed June 4, 1953
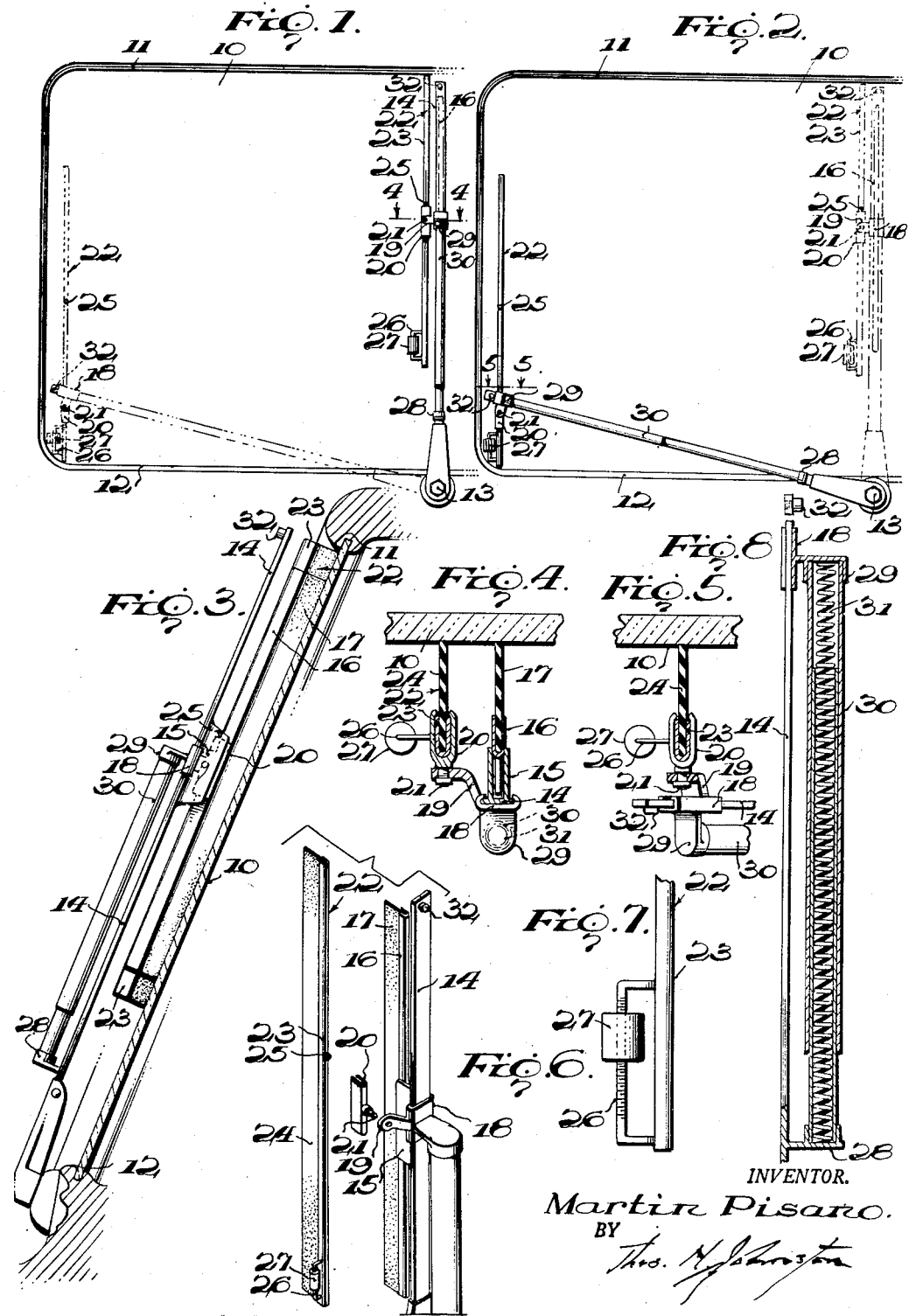
INVENTOR.
Martin Pisano.
BY

United States Patent Office 2,775,780
Patented Jan. 1, 1957

2,775,780

WINDSHIELD WIPERS

Martin Pisano, Hillside, N. J.

Application June 4, 1953, Serial No. 359,523

6 Claims. (Cl. 15—255)

This invention relates to an improved windshield wiper.

As will be appreciated, conventional windshield wipers most prevalently in use are of the type embodying a blade which is caused to swing in an arc back and fourth across the windshield, so that only a curved band across the windshield is wiped while other areas of the windshield needed for vision remain fogged with moisture.

The present invention therefore seeks, as one of its objects, to provide a windshield wiper embodying complemental blades, one of which, or the primary blade, is caused to swing back and forth across the windshield in the usual manner, while the other, or secondary blade, will be weighted to travel concurrently with the primary blade in a more or less vertical position for wiping areas of the windshield missed by the primary blade.

A further object of the invention is to provide a windshield wiper wherein a counterweight will be carried by the lower end portion of the secondary blade to resist the frictional drag of the blade against the windshield tending to pivot said blade out of vertical position, and wherein said weight may be adjusted lengthwise of the blade toward or away from the pivotal center thereof to either increase or decrease the effectiveness of said weight.

And the invention seeks, as a still further object, to provide a windshield wiper which will not be complicated and which may be readily employed in conjunction with existing mechanism now in use for oscillating conventional blades.

Other and incidental objects will appear as the description of the invention proceeds, and in the drawings:

Figure 1 is a front elevation showing approximately one-half of a conventional windshield in conjunction with my improved wiper, the wiper being shown in full lines at approximately the limit of its upward travel, and in dotted lines at substantially the limit of its downward travel.

Figure 2 is a view similar to Figure 1 and showing the wiper in full lines at subtsantially the limit of its downward travel, and in dotted lines at approximately the limit of its upward travel.

Figure 3 is a vertical section but showing the wiper in side elevation.

Figure 4 is a detail section on the line 4—4 of Figure 1.

Figure 5 is a detail section on the line 5—5 of Figure 2.

Figure 6 is a perspective view of the wiper arm, blades, and associated parts.

Figure 7 is a detail elevation of the counterweight.

Figure 8 is a detail section particularly showing the load spring employed in conjunction with the secondary blade.

Referring now more particularly to the drawings, I have shown my improved wiper in conjunction with approximately one-half of a conventional windshield. As will be appreciated, like wiper structure, now to be described, will also be employed in conjunction with the other half of the windshield, but for present purposes, a description of the wiper structure shown will suffice for both. The windshield glass is indicated at 10, the upper molding of the windshield frame at 11, and the lower molding of said frame at 12. The customary shaft of the usual oscillating mechanism, as employed for conventional wipers, is indicated at 13. The mechanical details of said oscillating mechanism do not concern the present invention, and may be of any approved character, it being sufficient to say that the shaft 13, when the wiper is in operation, is oscillated back and forth. As is usual, the shaft 13 projects forwardly beneath the windshield adjacent the lower molding 12 of the frame thereof.

Detachably fixed to the shaft 13 to be oscillated thereby is a flat arm 14 preferably of suitable resilient metal. If so desired, the resiliency of the arm may be employed to tension the wiper blades, later to be described, against the glass 10, or, if preferred, one or more auxiliary springs may be employed for the purpose, in accordance with conventional practice.

Spaced companion ears 15 are located substantially midway between the opposite ends of the arm 14 and extended from its inner side, and removably pivoted between said ears is a primary wiper blade 16 disposed in a plane with the arm therebeneath. The blade 16 is mounted to rock in the plane of the arm but is limited against rotation out of said plane, and includes the usual body bar which carries a rubber wiping strip 17 disposed to yieldably bear against the glass 10 of the windshield. Thus, as the shaft 13 is oscillated, the arm 14 will be rocked and the wiping strip 17 swung back and forth to wipe an arcuate band across the windshield glass.

Embracing the arm 14 is a sleeve 18 preferably of suitable resilient sheet metal. This sleeve is freely slidable along the arm and is provided with a laterally projecting, resilient extension 19 upon which is pivoted a channel-shaped clip 20 having a stud 21 swiveled through said extension. The clip 20 is also preferably formed of suitable resilient sheet metal and carries a secondary wiper blade 22 mounted by the clip and stud to swing in a plane at a right angle to the arm 14 parallel to the glass 10 of the windshield.

As clearly seen in Figure 6 of the drawings, the wiper blade 22 includes a metal, channel-shaped body bar 23 which is slidably received through the clip 20, and fixed in the channel of said bar is a rubber wiping strip 24. As perhaps best shown in Figure 4 of the drawings, the blade 22 is so supported by the arm 14, sleeve 18, and clip 20 that the wiping strip 24 is yieldably held against the glass 10 of the windshield. Projecting from the rear edge of the body bar 23 of the blade 22 is a stud 25 disposed to coact with the clip 20, as will be presently explained.

Extending parallel to the lower end of the body bar 23 of the blade 22 at one side thereof is a rod 26, the lateral ends of which are suitably fixed to said bar. The rod 26 may be of any approved length, and screwed on said rod is a counterweight 27 adjustable up and down on the rod lengthwise of the blade 22 toward or away from the pivotal center of said blade.

As will be perceived, the frictional drag against the windshield glass 10 of the portion of the wiping strip 24 above the pivotal center of the blade 22 will, as the arm 14 is swung, tend to rotate the blade in one direction, while the frictional drag against said glass of the portion of the strip 24 below said pivotal center will tend to rotate the blade in the opposite direction. As these opposing tendencies will not always balance, the counterweight 27 is provided. As will be seen, the counterweight will assist in maintaining the blade 22 in vertical position, and the influence of the counerweight on the blade tending to maintain said blade vertical may be varied by adjusting the counterweight along the rod 26. The counterweight may, of course, be varied in size to better accomplish its purpose.

Fixed to the outer side of the arm 14 near its lower end is a laterally projecting cup 28, and fixed to the outer side of the sleeve 18 is a like cup 29. Fixed at their outer ends in said cups are the resilient, flexible, telescopic members of a tubular sheath 30 adapted to yield with limited flexing of the arm. The companion members of the sheath may be of any approved material.

Disposed in the sheath 30 is a coil spring 31. This spring is of a strength to sustain the load of the sleeve 18 and blade 22 when the arm 14 is disposed in vertical position and more or less gently urge the sleeve toward the free end of the arm. Disposed on the arm near the free end thereof is a stop 32 for said sleeve.

It will now be assumed that the wiper arm 14 is disposed vertically, as shown in full lines in Figure 1 of the drawings, and is being swung down to the full line position of said arm shown in Figure 2. As previously described, the blade 22 will normally stand in approximately vertical position against the windshield glass 10 and, as the arm 14 swings down, will pivot upon the extension 19 of the sleeve 18 to maintain said position. In the vertical position of the arm 14, the upper end of the blade 22 will engage the upper molding 11 of the windshield frame for limiting the blade against upward movement by the load spring 31, but as the arm swings down and the upper end of the blade 22 is thus caused to leave the molding 11, the load spring will push the sleeve 18 outwardly along the arm. It is to be noted in this connection, however, that the load spring is not strong enough to shoot the sleeve 18 outwardly to the free end of the arm 14 in a single quick movement. Any such quick movement of the sleeve will be resisted by the frictional drag of the strip 24 of the blade 22 against the windshield glass 10, which frictional drag will limit the sleeve to a gradual outward movement on the arm by the spring. As will be perceived, the spring 31 will, however, by its outward urge on the sleeve 18, prevent the sleeve from binding or locking on the arm 14 as the arm swings down.

As the arm 14 approaches the end of its downward travel, the lower end of the blade 22 will engage the lower molding 12 of the windshield frame and follow therealong, so that as downward movement of the arm then continues to the end of the throw of said arm, the blade 22 will be pushed upwardly through the clip 20 while the sleeve 18 will be pushed by the spring 31 outwardly upon the arm 14 to engage the stop 32. Thus, the blade will be caused to travel in a more or less rectilinear path, so that the strip 24 of said blade will wipe a correspondingly straight band across the windshield glass 10 and clear portions of the glass missed by the primary blade 16.

Upon the return upward throw of the arm 14 from the full line position of Figure 2 of the drawings to the full line position of Figure 1, the upper end of the blade 22 will, when it reaches the upper molding 11 of the windshield frame, engage said molding and follow therealong, so that, as the arm 14 approaches the end of its upward travel, the blade will be pushed downwardly through the clip 20 when, as the arm continues to the end of its upward throw, the stud 25 on the blade 22 will engage the clip 20 and push said clip downwardly for returning the sleeve 18 to its original position on the arm 14.

Having thus described my invention, I claim:

1. A windshield wiper including an arm mounted for oscillating movement in front of a windshield having a glass provided with upper and lower moldings, blade carrying means slidable upon said arm, a wiper blade mounted to wipe said glass as the arm is swung, blade holding means slidably mounting the blade for endwise movement independently of said blade carrying means and pivotally connecting said blade with said blade carrying means to oscillate in a plane parallel to said glass, the blade being movable by said arm, as the arm is swung up, to engage at one end with said upper molding and be held downward thereby while said blade holding means is slidably moved upward and over said blade and also being movable by said arm, as the arm is swung down, to engage at its opposite end with said lower molding and be held upward thereby while said blade holding means is slidably moved upward over said blade means carried by the blade and disposed to engage said blade holding means for limiting the blade in its downward movement thereon, and yieldable means coacting between the arm and said blade carrying means gently pressing said blade carrying means toward the outer end of said arm.

2. A windshield wiper including an arm mounted for oscillating movement in front of a windshield having a glass provided with upper and lower moldings, blade carrying means slidable upon said arm, a wiper blade mounted to wipe said glass as the arm is swung, blade holding means slidably mounting the blade for endwise movement independently of said blade carrying means and pivotally connecting the blade with said blade carrying means to oscillate in a plane parallel to said glass, the blade being movable by said arm, as the arm is swung up, to engage at one end with said upper molding and be held downward thereby while said blade holding means is slidably moved upward over said blade and also being movable by said arm, as the arm is swung down, to engage at its opposite end with said lower molding and be held upward thereby while said blade holding means is slidably moved upward over said blade means carried by the blade and disposed to engage said blade holding means for limiting the blade in its downward movement thereon, and a counterweight carried by the lower end portion of the blade and tending to maintain the blade vertical as the arm is swung.

3. A windshield wiper including an arm mounted for oscillating movement in front of a windshield having a glass provided with upper and lower moldings, a primary wiper blade mounted upon said arm and disposed to wipe an area of said glass as the arm is swung, blade carrying means slidable upon said arm, a secondary wiper blade mounted to wipe, as the arm is swung, an area of said glass missed by the primary blade, blade holding means slidably mounting the secondary blade for endwise movement independently of said blade carrying means and pivotally connecting the secondary blade with said blade carrying means to oscillate in a plane parallel to said glass, the secondary blade being movable by said arm, as the arm is swung up, to engage at one end with said upper molding and be held downward thereby while said blade hold means is slidably moved upward over said blade and also being movable by said arm, as the arm is swung down, to engage at its opposite end with said lower molding and be held upward thereby while said blade holding means is slidably moved upward over said blade, and means carried by said secondary blade and disposed to engage said blade holding means for limiting the secondary blade in its downward movement thereon.

4. A windshield wiper including an arm mounted for oscillating movement in front of a windshield having a glass provided with upper and lower moldings, a sleeve slidable upon said arm, a wiper blade mounted to wipe said glass as the arm is swung, a clip slidably mounting the blade for endwise movement independently of said sleeve and provided with means pivotally connecting said blade with the sleeve to oscillate in a plane parallel to said glass, the blade being movable by said arm, as the arm is swung up, to engage at one end with said upper molding and be held downward thereby while said clip is slidably moved upward over said blade and also being movable by said arm, as the arm is swung down, to engage at its opposite end with said lower molding and be held upward thereby while said clip is slidably moved upward over said blade means carried by the blade and disposed to engage said clip for limiting the blade in its downward movement thereon, and a spring mounted at one end upon said arm and at its opposite end upon said sleeve and gently pressing the sleeve toward the outer end of said arm.

5. A windshield wiper including an arm mounted for oscillating movement in front of a windshield having a glass provided with upper and lower moldings, a sleeve slidable upon said arm, a wiper blade mounted to wipe said glass as the arm is swung, a clip slidably mounting the blade for endwise movement independently of said sleeve and provided with means pivotally connecting said blade with the sleeve to oscillate in a plane parallel to said glass, the blade being movable by said arm, as the arm is swung up, to engage at one end with said upper molding and be held downward thereby while said clip is slidably moved upward over said blade and also being movable by said arm, as the arm is swung down, to engage at its opposite end with said lower molding and be held upward thereby while said clip is slidably moved upward over said blade means carried by the blade and disposed to engage said clip for limiting the blade in its downward movement thereon, a rod carried by the lower end portion of the blade, and a counterweight adjustable upon said rod and tending to maintain the blade vertical as the arm is swung.

6. A windshield wiper including an arm mounted for oscillating movement in front of a windshield having a glass provided with upper and lower moldings, a primary wiper blade mounted upon said arm and disposed to wipe an area of said glass as the arm is swung, a sleeve slidable upon said arm, a secondary wiper blade mounted to wipe, as the arm is swung, an area of said glass missed by the primary blade, a clip mounting the secondary blade to slide thereon independently of said sleeve and pivotally connecting the secondary blade with said sleeve to oscillate in a plane parallel to said glass, the secondary blade being movable by said arm, as the arm is swung up, to engage at one end with said upper molding and be held downward thereby while said clip is slidably moved upward over said blade and also being movable by said arm, as the arm is swung down, to engage at its opposite end with said lower molding and be held upward thereby while said clip is slidably moved upward over said blade means carried by the secondary blade and disposed to engage said clip for limiting the secondary blade in its downward movement thereon, a cup carried by said arm, a cup carried by said sleeve, and a spring engaged at its ends in said cups and gently pressing the sleeve toward the outer end of said arm.

References Cited in the file of this patent
UNITED STATES PATENTS

| | | |
|---|---|---|
| 2,185,572 | Sawyer | Jan. 2, 1940 |
| 2,591,091 | O'Connor | Apr. 1, 1952 |
| 2,607,944 | Turner | Aug. 26, 1952 |
| 2,615,190 | Shaw | Oct. 28, 1952 |
| 2,644,187 | Lacy | July 7, 1953 |